United States Patent [19]
Sakano et al.

[11] Patent Number: 5,230,934
[45] Date of Patent: Jul. 27, 1993

[54] FROSTED CONTAINER

[75] Inventors: Kozaburo Sakano, Yokohama; Yuji Yamaguchi, Kawasaki; Toshiyuki Iwamoto, Tokyo, all of Japan

[73] Assignee: Toyo Seikan Kaisha Ltd., Tokyo, Japan

[21] Appl. No.: 813,922

[22] Filed: Dec. 27, 1991

[51] Int. Cl.$^5$ .................. B29D 23/00; B29D 23/20
[52] U.S. Cl. ..................... 428/35.7; 428/475.8; 428/483; 525/60; 525/55; 525/56; 525/61
[58] Field of Search ............ 428/35.7, 475.8, 483; 525/60, 55, 56, 61

[56]         References Cited
U.S. PATENT DOCUMENTS 4,255,490  3/1981  Katsura .................. 525/60

FOREIGN PATENT DOCUMENTS 0318654   9/1988  European Pat. Off. .
59-187817 10/1984  Japan .
1-163240   6/1989  Japan .
2-215529   8/1990  Japan .
3-197541   8/1991  Japan .

Primary Examiner—John Kight, III
Assistant Examiner—Duc Truong
Attorney, Agent, or Firm—Sughrue, Mion, Zinn, Macpeak & Seas

[57]         ABSTRACT

At least an outer layer of a plastic container is formed of a blend including an ethylene-propylene block copolymer containing 3 to 10% by weight, particularly 5 to 9% by weight of ethylene and a melt flow rate of 0.8 to 10 g/10 min. and a polyethylene having a given density at a weight ratio of 9:1 to 5:5. A plastic container made of an olefin resin having a frosted or matted appearance can be manufactured with excellent moldability without requiring any special working such as sand blasting the cavity surface of a mold. The container will gives an impression of shade off, depth and high grade.

10 Claims, 2 Drawing Sheets

FROSTED CONTAINER

BACKGROUND OF THE INVENTION

(1) Field of the Invention

The present invention relates to a plastic container having a frosted appearance and in particular to a plastic container having a frosted and high grade appearance which is similar to that of a ground glass container.

(2) Description of the Prior Art

Since the plastic containers are light weight and excellent in shock resistance and the other mechanical properties, they have been widely used as packaging containers for various contents in lieu of glass containers. Particularly, blown containers made of an olefin resin such as polyethylene and polypropylene are much demanded since they are relatively economical and easy to mold.

The plastic containers having a frosted or matted appearance has been strongly demanded as ground glass containers having been widely used. Such containers having a frosted or matted appearance gives an impression of shade off, depth and high grade and has been demanded particularly in the field of packaging containers for cosmetic products, toiletry goods and other home use goods.

A technique which has heretofore been adopted to provide a plastic having a frosted or matted appearance comprises sand blasting the cavity surface of a mold for blow molding and transferring an embossed pattern formed on the cavity surface to the outer surface of a plastic container which is being formed. However, this technique has drawbacks that special means to perform a sand blasting on the cavity surface of the mold is necessary and that the molded containers usually do not have a satisfactory frosted or matted appearance.

It seems that these drawbacks are related with a problem that the embossed pattern of the mold surface is not reproduced on the surface of the container when the molten plastic is brought into contact with the surface of the mold and is cooled and a problem that a satisfactory frosted or matted appearance is not obtained even if the embossed pattern on the mold surface is reproduced on the surface of the container at a high fidelity.

It is considered that this is due to a fact that the glass is completely amorphous while the plastic is more or less crystalline and a fact that the glass is completely transparent while the plastic has an inner haze.

SUMMARY OF THE INVENTION

The present inventors have found that a plastic container having a frosted appearance and a glossiness not higher than 30%, particularly not less than 20% can be positively obtained at a high reproducibility if the plastic container is formed of a given resin composition, that is, a blend containing a given ethylene-propylene block copolymer and a polyethylene having a density of 0.925 to 0.970 g/cm$^3$, particularly a linear low density polyethylene at a given weight ratio.

Therefore, it is an object of the present invention provide a plastic container formed of an olefin resin having a frosted or matted appearance which gives an impression of shade off, depth and high grade.

It is another object of the present invention to provide a plastic container formed of an olefin resin having a frosted or matted appearance which can be manufactured with an excellent molding characteristics without special means such as sand blasting the cavity surface of a mold.

In an aspect of the present invention, there is provided a plastic container having a frosted appearance comprising at least an outer layer which is formed of a blend including an ethylene-propylene block copolymer containing 3 to 10% by weight of ethylene and having a melt flow rate of 0.8 to 10 g/10 min. and polyethylene having a density of 0.925 to 9.70 g/cm$^3$, particularly a linear low density polyethylene.

In another aspect of the present invention, there is provided a plastic container having a frosted appearance, comprising a laminate including an outer layer which is formed of a blend including an ethylenepropylene block copolymer container 3 to 10% by weight of ethylene and having a melt flow rate of 0.8 to 10 g/10 min. and a polyethylene having a density of 0.925 to 0.979 g/cm$^3$, particularly a linear law density polyethylene; and an inner layer which is formed of an ethylene-propylene random copolymer containing 1 to 8% by weight of ethylene and a melt flow rate of 1 to 3 g/10 min.

DETAILED DESCRIPTION OF THE INVENTION

Figure 1:
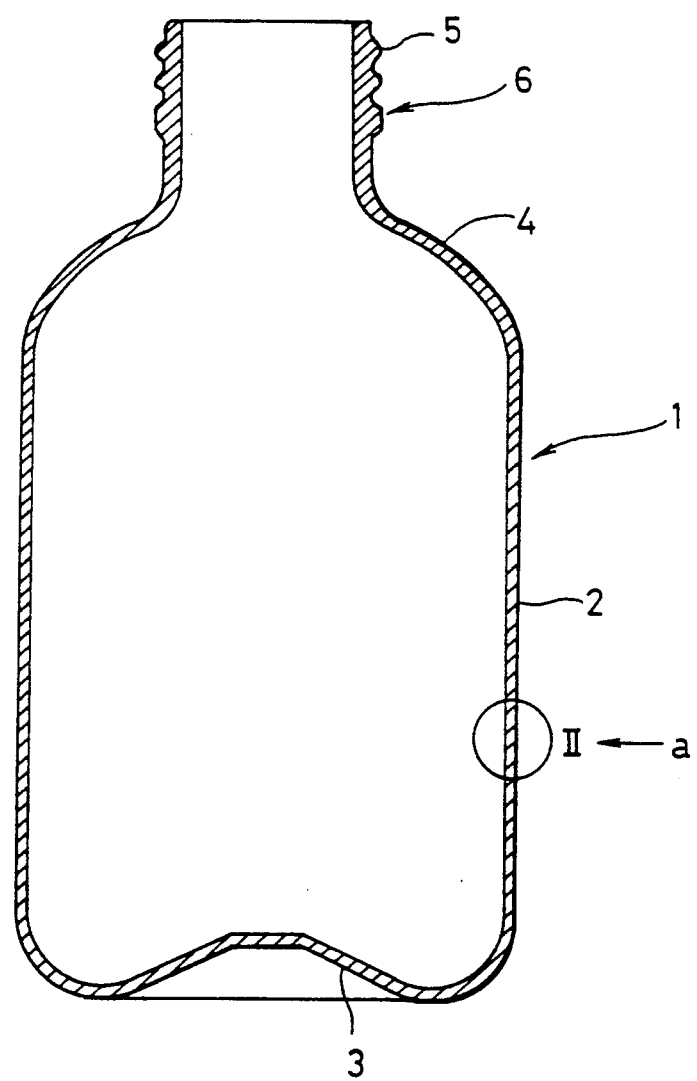
FIG. 1 is an elevational and sectional view showing an example of a multi-layered plastic container of the present invention.

The present invention is based on plastic container can be positively provided with an excellent frosted or matted appearance on the outer surface thereof if at least the outer surface layer of the plastic container is formed of a blend comprising a given ethylene-propylene block copolymer and a polyethylene having a density of 0.925 to 0.970 g/cm$^3$, particularly a linear low density polyethylene irrespective of whether or not a container forming mold is embossed on the inner surface thereof.

The reason why particularly, an ethylene-propylene block copolymer is selected among various polypropylene resins is that the ethylene-propylene block copolymer has a good compatibility with polyethylene which will be described hereafter and exhibits a peculiar action which is capable of providing an excellent frosted or matted appearance by a combination with a given polyethylene. For example, usual homopolypropylene generally has a poor incompatibility with polyethylene and has a tendency to remarkably lower the inner haze of the container and lowers the mechanical properties such as shock resistance of the container. On the other hand, the ethylene-propylene random copolymer scarcely provides a transparent surface and a frosted or matted appearance even if it is blended with polyethylene as will be described hereafter.

It is also essential to select the polyethylene having a given density as polyethylene to be blended with an ethylene-propylene block copolymer. Even if a polyethylene having a very low density is blended with the ethylene-propylene block copolymer, only a container having transparency on the surface thereof is provided so that frosted or matted appearance is hardly obtained.

It has been found from the choices from various materials and the results of a number of experiments that a plastic container can be positively provided with an excellent frosted or matted appearance on the outer surface thereof is at least the outer surface layer of the plastic container is formed of a blend of a given ethylene-propylene block copolymer with a given polyethylene in accordance with the present invention. Although the grounds of this phenomenon have not been theoretically analyzed yet, the present inventors presume as follows:

It can be considered that the blend of the present invention, the ethylene-propylene block copolymer which is a main constituent exists in the form of continuous matrix while the given polyethylene having a moderate compatibility exists in a dispersion phase having a moderate particle size and that when the molten blend is brought into contact with the surface of a mold so that it begins to be cooled from temperature not less than the melting point, the ethylene-propylene block copolymer having a high melting point firstly solidifies and crystallizes and then the polyethylene solidifies and crystallizes. It is deemed that since the given polyethylene is transformed into a state of high crystallization degree, that is, a high density state when it is transformed from a molten state to a crystallized state, both generation of embossed pattern due to contraction of volume and emulsification due to crystallization from the dispersion phase occur on the surface of the container which is firstly cooled. The frosted and matted appearance of the plastic container is caused by two factors, a first factor of scattering of light rays on the outer surface of the container and a second factor of the balance between the transmission and scattering of light rays in the wall of the container. It is considered that the container of the present invention has an excellent frosted or matted appearance due to generation of the above mentioned micro-structure.

It is important that the ethylene-propylene block copolymer contains 3 to 10% by weight of ethylene and has a melt flow rate of 0.8 to 10 g/min. The ethylene content which is lower than the above mentioned range provides a poor compatibility with polyethylene, resulting in that satisfactory frosted or matted appearance can not be obtained. The ethylene content which is higher than the above mentioned range provides an excessive high compatibility with ethylene, resulting in that no satisfactory frosted or matted appearance can be obtained and that the heat resistance and mechanical properties of the container tends to lower. If the melt flow rate is lower than the above mentioned range, it will become harder that the frosted or matted appearance is exhibited. If the melt flow rate is higher than the above mentioned range, the melt flow characteristics of the resin is excessively high so that no satisfactory frosted or matted appearance can be obtained and mechanical properties of the container tends to lower.

It is preferable in the present invention that an ethylene-propylene block copolymer and a polyethylene which falls in a given range of density, particularly a linear low density polyethylene be used at a weight ratio 9:1 to 5:5. If the content of the ethylene is lower than the foregoing range, formation of the above mentioned micro-dispersed structure will become difficult so that satisfactory frosted or matted appearance can not be obtained. On the other hand, if the content of the polyethylene is higher than the foregoing range, the compatibility between both components becomes worse so that a satisfactory frosted or matted appearance can not be obtained.

Although the container of the present invention may be any layer structure provided that the blend constitutes the outer layer of the container, the container may include only a single layer formed of the blend or multilayers formed of the blend and the other resins. Particularly preferable container is made of a laminate including an outer layer formed of the blend and an inner layer formed of an ethylene-propylene random copolymer containing 1 to 8% by weight of ethylene and having a melt flow rate of 1 to 5 g/10 minutes. Since the copolymer which constitutes the inner layer, that is, the ethylene-propylene random copolymer containing 1 to 6% by weight of ethylene and having a melt flow rate of 1 to 5 g/10 minutes is excellent particularly in transparency, the combination of this copolymer with the blend provides a frosted or matted appearance and an impression of depth and grave.

Ethylene-Propylene Block Copolymer

The ethylene-propylene block copolymer used for the blend of the present invention generally comprises homopropylene polymerized blocks and ethylene containing polymerized blocks which are bonded thereto. The ethylene containing polymerized blocks may include homoethylene block having ethylene alone or ethylene-propylene random copolymerized blocks mainly containing ethylene. In brief, it suffices that the ethylene containing blocks contains 3 to 10% by weight of ethylene. The melt flow rate (MFR) of the copolymer falls in the above mentioned range of 0.8 to 10 g/10 minutes.

Polyethylene Component

The other component used for the blend of the present invention, a high density polyethylene, a medium density polyethylene, or a linear low density polyethylene may be any polyethylene which is known per se. Specifically, high and medium density polyethylene and a linear low density polyethylene are preferable. It is preferable that the high density polyethylene has a density of 0.940 to 0.970 g/cc, particularly 0.945 to 0.965 g/cc and a melt flow rate (MFR) of 0.2 to 0.8 g/10 min. It is preferable that the medium density polyethylene has a density of not higher than 0.940 g/cc, and a melt flow rate (MFR) of 0.2 to 5.0 g/10 min., particularly 0.3 to 3.0 g/10 min. Although the linear low density polyethylene has short side chains based on $\alpha$-olefin, the chain structure of the polymer is linear on the whole. It is preferable that the $\alpha$-olefin contained in the polymer be $\alpha$-olefin having 4 or more carbon atoms, containing for example, butene-1, petene-1, hexene-1, 4-methylepentene-1, heptene-1. octene-1, decen-1 and the like. The content of the $\alpha$-olefin in the linear low density polyethylene is closely related with the density of the polymer. The content of the polymer. The content of the $\alpha$-olefin is generally in the range 0.5 to 15% by mol, particularly 1.5 to 10% by mol. For the purpose of the present invention, the linear low density polyethylene having a relatively higher density of 0.925 to 0.945 g/cc, particularly, 0.930 to 0.940 g/cc and a melt flow rate (MFR) of 0.2 to 5.0 g/10 min., particularly 0.3 to 3.0 g/10 min. is preferable.

Blend

The block copolymer component and the high density polyethylene component are used at a weight ratio of 9:1 to 5:5, particularly 8:2 to 7:3. Use of them at the latter weight ratio 8:2 to 7:3 provides a higher grade frosted appearance. The blend can be of course blended with any ingredients which are known per se, such as lubricant, anti-oxidant, ultraviolet absorbing agent, coloring agent (dye), stabilizer in accordance with a formulation which is known per se.

Container

Referring now to FIG. 1, there is shown an example of the plastic container of the present invention. The container comprises a body 2, a bottom 8 which is formed integrally with the lower end of the body 2 by generally pinching off a parison, and a neck 6 having an opening 5 which is hermetically engaged with a lid (not shown) and is integral with the body 2 via a shoulder 4. At least the outer surface of the container is formed of a blend comprising an ethylene-propylene block copolymer and a given polyethylene. The wall of the container of FIG. 1 includes a single layer formed of the blend.

The container of the present invention is, of course, preferably a multi-layered container having 2, 3 or more layers.

Figure 2:
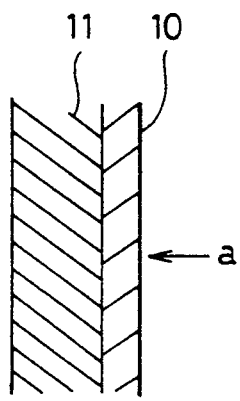
FIG. 2 is an enlarged sectional view showing an example of the wall of the multi-layered plastic container.

FIG. 2 shows an example of a multi-layered container. The container comprises an outer layer 10 formed of the above mentioned blend and an inner layer 11 made of the other olefin resin. The other olefin resin is preferably a propylene resin. A remarkable advantage can be obtained in view of appearance if a material comprising the above mentioned ethylene-propylene random copolymer is used for the innermost layer.

Figure 3:
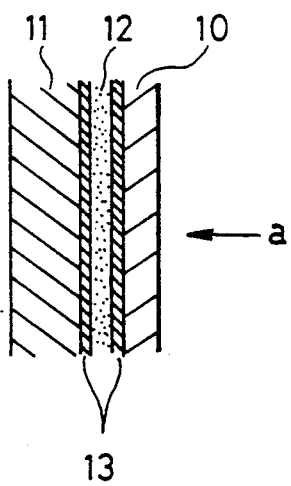
FIG. 3 is an enlarged sectional view showing another example of the wall of the multi-layered plastic container.

FIG. 3 shows another example of the multi-layered container. The container comprises an outer layer 10 which is formed of the blend, and an inner layer 11 which is formed of the other olefin resin and an intermediate layer 12 interposed between the outer and inner layers 10 and 11, and is formed of a gas barrier resin. Bonding layers 13 are generally interposed between the intermediate layer 12 and the inner and outer layers 10 and 11. The olefin resin which forms the inner layer is preferably the propylene resin and more preferably the above mentioned ethylene-propylene random copolymer similarly to the case of FIG. 3.

In this embodiment, a gas barrier resin generally having an oxygen permeability coefficient ($PO_2$) not higher than $5.5 \times 10^{-12}$ cc.cm/cm$^2$ sec. cmHg, particularly $4.5 \times 10^{-12}$ cc.cm/cm$^2$ .sec. cmHg and having the above mentioned transparency is preferably used. Particularly, an ethylene/vinyl alcohol copolymer containing 20 to 50% by mol of ethylene and not higher than 5% by mol of unsaponified vinyl ester residue or homopolyamide, copolyamide having 3 to 30, particularly 4 to 25 amide radicals per 100 carbon atoms and a blend thereof are preferably used. Particularly, the polyamide may include a polycondensate between aliphatic acid and aromatic diamine, such as polycarbonate between methaxylylene diamine and adipic acid. Of course, the above mentioned ethylene/vinyl alcohol copolymer and polyamide may be used as a blend. They may be blended with the other thermoplastic resin such as polyolefin or a resin which provides a bonding power with polyolefin in such a range that intrinsic properties of the ethylene/vinyl alcohol copolymer and the polyamide are not lost, that is, in the range not higher than 20% by weight.

If there is no bonding layer between the gas barrier resin layer and the inner and outer layers, it is preferably that a layer formed of a bonding agent such as acid modified olefin resin; polyethylene and polypropylene which are graft modified with ethylene unsaturated carboxylic acid such as maleic anhydride, acrylic acid, methacrylic acid, itaconic anhydride be interposed between both resin layers. The above mentioned resin may be incorporated in the gas barrier layer and/or at least one of the outer and inner surface layers in lieu of interposing the bonding layer therebetween.

In the container of the present invention, the layer of the above mentioned blend occupies at least 3%, preferably t to 95% of the thickness of the wall of the container.

Molding of the Container

Molding of the container can be performed by the known melt molding method using a parison, sheet or prefoam having a bottom of a single layer of the above mentioned blend or a laminate comprising a single layer of the blend and the other resin layer. For example, the container of FIG. 1 can be manufactured by a so-called blowing method comprising the steps of melt extruding a single layered or multi-layered parison, supplying the parison into a split mold and inflating the parison by blowing a fluid into the mold. After a single layered or multi-layered sheet has been manufactured by the melt extruding method, a cup-shaped container can be manufactured by subjecting to any one of the vacuum molding, pressurized air molding, or plug assisted molding the sheet which is in a melt condition. A tube-shaped container can be manufactured by a blowing method. It is to be understood that the method of manufacturing the container is not limited to these method. The container can also be manufactured by, for example, a melt injection method. A mold having a flat inner surface, or a mold having a finely embossed inner surface can be used.

The plastic container of the present invention has an excellent frosted or matted surface. The glossiness (in accordance with JIS K7150, incident angle 60°) not higher than 30%, particularly not higher than 20%. This provides an appearance which gives an impression of depth or high grade.

EXAMPLES

Example 1

A blend comprising 80% by weight of a propylene-ethylene block copolymer having a melt flow rate (MFR) of 2 b/10 min. and an ethylene content of 8% by mol and 20% by weight of a high density polyethylene having a density of 0.96 g/cm$^3$ was supplied to an outer layer extruder and a propylene-ethylene copolymer having an ethylene content of 4% by mol was supplied to an inner layer extruder so that a double layered parison was extruded. A container having an inner volume of about 220 ml was obtained by blowing the parison in each of two kinds of molds having mirror-finished and blasted inner surfaces, respectively.

The wall of the body of the container had outer and inner layers which are 100 μm and 900 μm in thickness, respectively.

The container had matted appearance giving an impression of depth which is very similar to that of the ground glass container.

Example 2

A parison was prepared similarly to Example 1 except that the weight ratio of the ethylene-propylene block copolymer to the high density polyethylene was 50:50. A container having an inner volume of about 220 ml was obtained by blowing the parison in a blasted mold.

The wall of the body of the container has outer and inner layers which are 100 $\mu$m and 900 $\mu$m in thickness, respectively.

Example 3

A blend comprising 90% by weight of a propylene-ethylene block copolymer having a melt flow rate (MFR) of 2 g/10 min. and an ethylene content of 8% by mol and 10% by weight of a high density polyethylene was supplied to an outer layer extruder, a propylene-ethylene copolymer having an MFR of 1.2 g/10 min. and containing 4% by mol of ethylene was supplied to an inner layer extruder, and ethylene-vinylalcohol copolymer containing 32% by mol of ethylene which was blended with a drying agent was supplied to an intermediate layer extruder, a maleic acid graft modified polyolefin was supplied to a bonding agent layer extruder and a scrap resin was supplied to a scrap extruder so that a six layered parison was extruded. By blowing the parison in a blasted mold, a container having an inner volume of about 220 ml was obtained.

The wall of the body of the container comprised an outermost layer of the propylene-ethylene block copolymer which is 90 $\mu$m in thickness, a bonding agent layer which is 10 $\mu$m in thickness, an ethylene/vinyl alcohol copolymer layer which is 20 $\mu$m in thickness, a bonding agent layer which is 10 $\mu$m in thickness and a scrap layer which is 230 $\mu$m in thickness and an innermost layer of the propylene-ethylene copolymer which is 40 $\mu$m in thickness. The container had an appearance giving an impression of depth and an excellent gas barrier properties.

Example 4

A container having an inner volume of about 220 ml was obtained similarly to Example 1 except that a linear low density polyethylene having a density of 0.935 g/cc was used in lieu of the high density polyethylene used in Example 1.

The wall of the body of the container comprise outer and inner layers which are 50 $\mu$m and 1000 $\mu$m in thickness, respectively. The container has a matted appearance giving an impression of depth similar to a ground glass container.

Example 5

A parison was prepared similarly to Example 3 except that a linear low density polyethylene having a density of 0.935 g/cc was used in lieu of the high density polyethylene used in Example 3. A container having an inner volume of about 220 ml was obtained by blowing the parison in each of two kinds of mirror finished and blasted molds.

The wall of the body of the container comprised an outermost layer of the propylene-ethylene block copolymer which is 90 $\mu$m in thickness, a bonding agent layer which is 10 $\mu$m in thickness, an ethylene/vinylalcohol copolymer layer which is 20 $\mu$m in thickness, a bonding agent layer which is 10 $\mu$m in thickness and a scrap layer which is 230 $\mu$m in thickness and an innermost layer of the propylene-ethylene random copolymer which is 40 $\mu$m in thickness. The container had a appearance giving an impression of depth and an excellent gas barrier properties.

Comparative Example 1

A container having an inner volume of about 220 ml was obtained by blowing the propylene-ethylene block copolymer which was used in Example 1. The container was semitransparent and had no appearance giving an impression of depth.

Comparative Example 2

A container having an inner volume of about 220 ml was obtained by blowing the high density polyethylene which was used in Example 1. The container was semitransparent and had no appearance giving an impression of depth.

Comparative Example 3

A container having an inner volume of about 220 ml was obtained by stretch blowing polyethylene terephthalate (PET) and the container was subjected to frost working on the surface thereof by silica coating.

Comparative Example 4

A container having an inner volume of about 220 ml was obtained by blowing the propylene-ethylene block copolymer used in Example 4. The container was semitransparent and had no appearance giving an impression of depth.

Comparative Example 5

A container having an inner volume of about 220 ml was obtained by blowing the high density polyethylene having a density of 0.96 g/cc. The container was semitransparent and had no appearance giving an impression of depth.

Comparative Example 6

A blend comprising 80% by weight of an ethylene-propylene block copolymer having a melt flow rate (MFR) of 2 b/10 min. and containing 8% by mol of ethylene and 20% by weight of a low density polyethylene having a density of 0.92 g/cc was supplied to an outer layer extruder and a propylene-ethylene random copolymer having an MFR of 3.0 g/10 min. and containing 4% mol of ethylene was supplied to an inner layer extruder so that a double layered parison was extruded. A container having an inner volume of about 220 ml was obtained by blowing the parison in a mold.

The wall of the body of the container comprised outer and inner layers which are 50 $\mu$m and 1000 $\mu$m in thickness, respectively. The container had glass on the surface thereof and less matted appearance.

The glossiness (in accordance with JIS K7105 at an incident angle 60°), the light ray transmittance in water and the wall thickness of these containers were measured. The results were shown in Table 1. The light ray transmittance in water was measured as follows: A specimen was prepared from the body of a container. The specimen was immersed into water in a transmitting cell and is irradiated with light rays having a wave length of 450 $\mu$m and the transmittance of the light ray therethrough was measured by assuming the transmittance of water 100%.

polymer and the linear low density polyethylene at a weight ratio of 9:1 to 5:5.

TABLE 1

| | Outer layer material and mixing ratio | Mold Surface | Result of measurements 60 glossiness (%) | Light Ray Transmittance in Water (%) | Wall Thickness (mm) |
|---|---|---|---|---|---|
| Example 1 | PP block/HDPE (8/2) | frosted | 5 | 34 | 1 |
| | | mirror | 8 | 24 | |
| Example 2 | PP block/HDPE (5/5) | frosted | 5 | 25 | 1 |
| Example 3 | PP block/HDPE (9/1) | frosted | 5 | 33 | 0.4 |
| Example 4 | PP block/L-LDPE (8/2) | frosted | 6.0 | 34 | 1 |
| | | mirror | 6.5 | 24 | |
| Example 5 | PP block/L-LDPE (9/1) | frosted | 6.5 | 33 | 0.4 |
| | | mirror | | | |
| Comparative Example 1 | PP block | frosted | 5.5 | 42 | 1 |
| | | mirror | 6.5 | 40 | |
| Comparative Example 2 | HDPE | frosted | 6.5 | 21 | 1 |
| | | mirror | 7.5 | 22 | |
| Comparative Example 3 | PET | frosted | 5.5 | 54 | 0.4 |
| Comparative Example 4 | PP block | frosted | 5.5 | 42 | 1 |
| | | mirror | 6.5 | 40 | |
| Comparative Example 5 | HDPE | frosted | 6.5 | 21 | 1 |
| | | mirror | 7.5 | 22 | |
| Comparative Example 6 | PP block/LDPE | frosted | 8.0 | 54 | 0.4 |

What is claimed is:

1. A plastic container having a frosted appearance comprising at least an outer layer which is formed of a blend comprising (A) and ethylene-propylene block copolymer containing 3 to 10% by weight of ethylene and having a melt flow rate of 0.8 to 10 g/10 min. and (B) polyethylene having a density of 0.925 to 0.970 g/cm$^3$, at a weight ratio (a):(B) of 9:1 to 5:5.

2. A plastic container having a frosted appearance, comprising a laminate comprising (i) an outer layer which is formed of a blend of (A) an ethylene-propylene block copolymer containing 3 to 10% by weight of ethylene and having a melt flow rate of 0.8 to 10 g/10 min. and (B) a polyethylene having a density of 0.925 to 0.970 b/cm$^3$ at a blend weight ratio (A):(B) of 9:1 to 5:5 and (ii) an inner layer which is formed of an ethylene-propylene random copolymer containing 1 to 85 by weight of ethylene and a melt flow rate of 1 to 5 g/10 min.

3. A plastic container as defined in claim 1 or 2 in which said polyethylene is a high density polyethylene having a density of 0.940 to 0.970 g/cm$^3$.

4. A plastic container as defined in claim 1 or 2 in which said polyethylene is linear low density polyethylene having a density of 0.925 to 9.45 g/cm$^3$.

5. A plastic container as defined in claim 4 in which said blend contains the ethylene-propylene block co- 6. A plastic container as defined in claim 1 wherein it is formed of a laminate composed of a polyethylene layer forming said outside surface and a layer containing an ethylene/vinyl alcohol copolymer.

7. A plastic container as defined in claim 2 in which an intermediate layer formed of an ethylene/vinyl alcohol copolymer is formed between said outer layer and said inner layer.

8. A plastic container as defined in claim 1 or 2 wherein said blend comprises a continuous matrix of said ethylene-propylene block copolymer and a dispersion phase of said polyethylene.

9. A plastic container as defined in claim 1 or 2 wherein said blend comprises (A) said ethylene-propylene block copolymer and (B) said polyethylene at a blend weight ratio (A):(B) of 8:2 to 7:3.

10. A plastic bottle having a frosted appearance comprising an outer layer of a blend comprising (A) an ethylene-propylene block copolymer containing 3 to 10% by weight of ethylene and having a melt flow rate of 0.8 to 10 g/10 min. and (B) a polyethylene having a density of 0.925 to 0.975 g/cm$^3$ at a weight ratio (A):(B) of 9:1 to 5:5, and an inner layer of an ethylene-propylene random copolymer containing 1 to 8% by weight by ethylene and a melt flow rate of 1 t 5 g/10 min., said outer layer occupying at least 3% of the thickness of the wall of the bottle.

* * * * *